United States Patent
Clermont et al.

(10) Patent No.: US 9,541,031 B2
(45) Date of Patent: Jan. 10, 2017

(54) DEVICE FOR MODULATING A GAS EJECTION SECTION

(71) Applicant: HERAKLES, Le Haillan (FR)

(72) Inventors: Mathieu Clermont, Saumos (FR);
Alain Remigi, Cestas (FR);
Jean-Michel Larrieu, Macau (FR);
Philippe Marlin, Le Pian Medoc (FR)

(73) Assignee: HERAKLES, Le Haillan (FR)

( * ) Notice: Subject to any disclaimer, the term of this patent is extended or adjusted under 35 U.S.C. 154(b) by 0 days.

(21) Appl. No.: 14/773,042

(22) PCT Filed: Mar. 4, 2014

(86) PCT No.: PCT/FR2014/050485
§ 371 (c)(1),
(2) Date: Sep. 4, 2015

(87) PCT Pub. No.: WO2014/135789
PCT Pub. Date: Sep. 12, 2014

(65) Prior Publication Data
US 2016/0010591 A1    Jan. 14, 2016

(30) Foreign Application Priority Data

Mar. 7, 2013   (FR) ...................................... 13 00515

(51) Int. Cl.
*F02K 9/08*    (2006.01)
*F02K 9/86*    (2006.01)
*F02K 9/26*    (2006.01)

(52) U.S. Cl.
CPC . *F02K 9/86* (2013.01); *F02K 9/08* (2013.01); *F02K 9/26* (2013.01)

(58) Field of Classification Search
CPC ................. F02K 9/08; F02K 9/26; F02K 9/86
See application file for complete search history.

(56) References Cited

U.S. PATENT DOCUMENTS

| | | | |
|---|---|---|---|
| 2,583,570 A | 1/1952 | Hickman | |
| 2,637,973 A * | 5/1953 | Lawrence, Jr. | ........... F02K 9/48 114/20.2 |

(Continued)

FOREIGN PATENT DOCUMENTS

| | | |
|---|---|---|
| FR | 2 740 105 A1 | 4/1997 |
| GB | 2 156 290 A | 10/1985 |

OTHER PUBLICATIONS

International Search Report as issued in International Patent Application No. PCT/FR2014/050485, dated Jul. 7, 2014.

(Continued)

*Primary Examiner* — Gerald L Sung
*Assistant Examiner* — William Breazeal
(74) *Attorney, Agent, or Firm* — Pillsbury Winthrop Shaw Pittman LLP

(57) ABSTRACT

A modulator device for modulating a gas ejection section, includes a shutter member for partially shutting a nozzle throat, a control guide of the shutter member, a main piston, and a primer piston. The control guide is movable between a retraction position for retracting the partial shutter element relative to the nozzle throat and a shutting position in which the partial shutter element is in contact with the nozzle throat. The primer piston is movable between a rest position and a priming position for priming the main piston when the pressure in the modulator device reaches a first predetermined value. The main piston is movable between a first position for locking the control guide against movement in its retraction position, and a second position for locking the control guide when the pressure in the modulator device reaches a second predetermined value less than the first predetermined value.

18 Claims, 8 Drawing Sheets

(56) References Cited

U.S. PATENT DOCUMENTS

| | | | | |
|---|---|---|---|---|
| 3,073,112 A | * | 1/1963 | Bleikamp, Jr. | F02K 9/86 60/242 |
| 3,150,485 A | * | 9/1964 | Hickerson | F02K 9/86 60/258 |
| 3,230,704 A | * | 1/1966 | Lovingham | F02K 9/52 60/225 |
| 3,608,312 A | * | 9/1971 | Miltenberger | F02K 9/86 60/204 |
| 5,491,973 A | | 2/1996 | Knapp et al. | |

OTHER PUBLICATIONS

International Preliminary Report on Patentability and the Written Opinion of the International Searching Authority as issued in International Patent Application No. PCT/FR2014/050485, dated Sep. 8, 2015.

* cited by examiner

DEVICE FOR MODULATING A GAS EJECTION SECTION

CROSS REFERENCE TO RELATED APPLICATIONS

This application is the U.S. National Stage of PCT/FR2014/050485 filed Mar. 4, 2014, which in turn claims priority to French Application No. 1300515 filed Mar. 7, 2013. The contents of both applications are incorporated herein by reference in their entirety.

BACKGROUND OF THE INVENTION

The present invention relates to the general field of thrusters or rocket engines for delivering thrust for driving aerospace vehicles such as missiles, launchers, or indeed satellites, using the principle of propulsion by reaction or by ejecting gas. The invention relates more precisely, but not exclusively, to the fixed diverging portion nozzles fitted to solid propellant thrusters.

A solid propellant thruster is mainly constituted by a shell containing a block of powder (propellant), an ignitor, and a nozzle with a fixed diverging portion. The block of powder is pierced by a channel lying on the axis of the thruster that acts as a combustion chamber. The ignitor ignites the powder at one end of the shell and combustion of the propellant propagates from the front towards the rear of the thruster. The powder burns at a predefined rate, thereby producing combustion gas that is expelled via the nozzle.

The throat section of the nozzle makes it possible to control the combustion of the block of powder so as to maintain a desired pressure in the combustion chamber while producing the expected thrust. Thus, for a thruster delivering thrust at a single discharge rate, the throat section of the nozzle is unvarying and predetermined as a function of the desired level of thrust.

Nevertheless, having recourse to a single unvarying throat section is not suitable for a thruster that has two rates of operation (typically a high discharge rate and a low discharge rate).

In order to mitigate such a drawback, it is known to provide the nozzle with a throat section that is variable. In practice, a needle that is movable in translation is received inside the nozzle. The position of the needle in the flow of combustion gas serves to determine the flow section for the gas passing through the nozzle, thereby adjusting the gas ejection section to the operating rate of the thruster.

Nevertheless, the positioning systems associated with the movable needle are active systems requiring an external source of energy in order to operate, thereby making more complex the device for modulating the ejection section and increasing the risk of the device failing or operating in faulty manner. There thus exists a need to provide modulation of the ejection section in a nozzle without using an external source of energy so as to cause the combustion gas to pass through the main ejection section of the nozzle during a stage of operation with a high level of pressure in the thruster (corresponding to operating at a high discharge rate) and then, during a stage of operation at a lower level of pressure in the thruster (corresponding to operating at a low discharge rate), causing the gas to pass via a secondary ejection section positioned in the nozzle, in order to optimize the thrust coefficients during the various stages of operation (high discharge rate and low discharge rate).

OBJECT AND SUMMARY OF THE INVENTION

This object is achieved by a modulator device for modulating a gas ejection section, the device being for placing inside a nozzle upstream from the throat of said nozzle, the modulator device comprising a shutter member for partially shutting the nozzle throat, a control guide for the shutter member, a main piston, and a primer piston, the control guide for the shutter member being movable between a retraction position in which the partial shutter element is held at a distance from the nozzle throat and a shutting position in which the partial shutter element is in contact with the nozzle throat;

the primer piston being movable between a rest position in which it locks the main piston against moving, and a priming position in which it unlocks movement of the main piston, said primer piston moving from the rest position to the priming position when the pressure in the modulator device reaches a first predetermined value; and the main piston being movable between a first position in which movement of the control guide of the shutter member is locked in the retraction position, and a second position in which movement of the control guide of the shutter member is unlocked, the main piston moving from the first position to the second position when the primer piston is in its priming position and when the pressure in the modulator device reaches a second predetermined value less than the first predetermined value.

The modulator device for modulating a gas ejection section makes it possible to define two modes of operation for the nozzle, namely a first mode of operation at a high discharge rate in which the partial shutter member is axially set back from the throat of the nozzle, and a second mode of operation at a low discharge rate in which the partial shutter member is axially in abutment against the throat. In the first mode of operation, the flow section for the combustion gas leaving the nozzle is at a maximum. In the second mode of operation, the flow section for the combustion gas is reduced to no more than the passages arranged in the partial shutter member. Thus, the modulator device of the invention makes it possible to optimize the thrust coefficient to different stages of operation of a thruster corresponding to different levels of pressure therein.

In addition, the actuation and positioning of the partial shutter element against the nozzle throat are performed in entirely passive manner, i.e. without using any external source of energy, with only the pressure of the ejection gas in the nozzle being used for priming and triggering the modulator device for modulating the gas ejection section.

In a first aspect of the device of the invention, it includes a return spring for holding the primer piston in its rest position, the return spring presenting stiffness determined in such a manner that said spring compresses when the pressure in the modulator device reaches the first predetermined value.

In a second aspect of the device of the invention, it includes a thrust spring held in compression against the main piston, said thrust spring exerting on the main piston a thrust force that is greater than the pressure exerted on said main piston when the pressure in the modulator device reaches the second predetermined value.

In a third aspect of the module of the invention, it includes one or more balls placed around the outer wall of the primer piston, said balls being held in a hosing extending both in the main piston and in a stationary jacket surrounding said main piston while the primer piston is in its rest position, the primer piston including one or more cavities suitable for receiving the ball(s) in part when said primer piston is in its priming position so as to unlock the movement of the main piston.

In a fourth aspect of the module of the invention, it includes one or more balls placed around the outer wall of the main piston, said balls being held in a housing extending both in a stationary jacket surrounding the main piston and in the control guide of the shutter member when the main piston is in the first position, the main piston including one or more cavities suitable for partially receiving the ball(s) when said main piston is in its second position so as to unlock movement of the control guide of the shutter member.

In a fifth aspect of the module of the invention, the main piston is suitable for pushing the control guide of the shutter member towards its shutting position when the primer piston is in its priming position and when the pressure in the modulator device reaches a second predetermined value less than the first predetermined value.

In a sixth aspect of the module of the invention, the control guide of the shutter member is mounted on a jacket of the main piston by a sliding connection.

In a seventh aspect of the module of the invention, the control guide of the shutter member is mounted on a jacket of the main piston via a two-start screw connection.

The invention also provides a nozzle of variable throat section comprising a nozzle throat and a diverging portion, the nozzle being characterized in that it further comprises a modulator device of the invention for modulating a gas ejection section, said modulator device being placed in the nozzle upstream from said nozzle throat.

The invention also provides a rocket engine or thruster including a nozzle of variable throat section as defined above.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF THE INVENTION

Figure 1A:
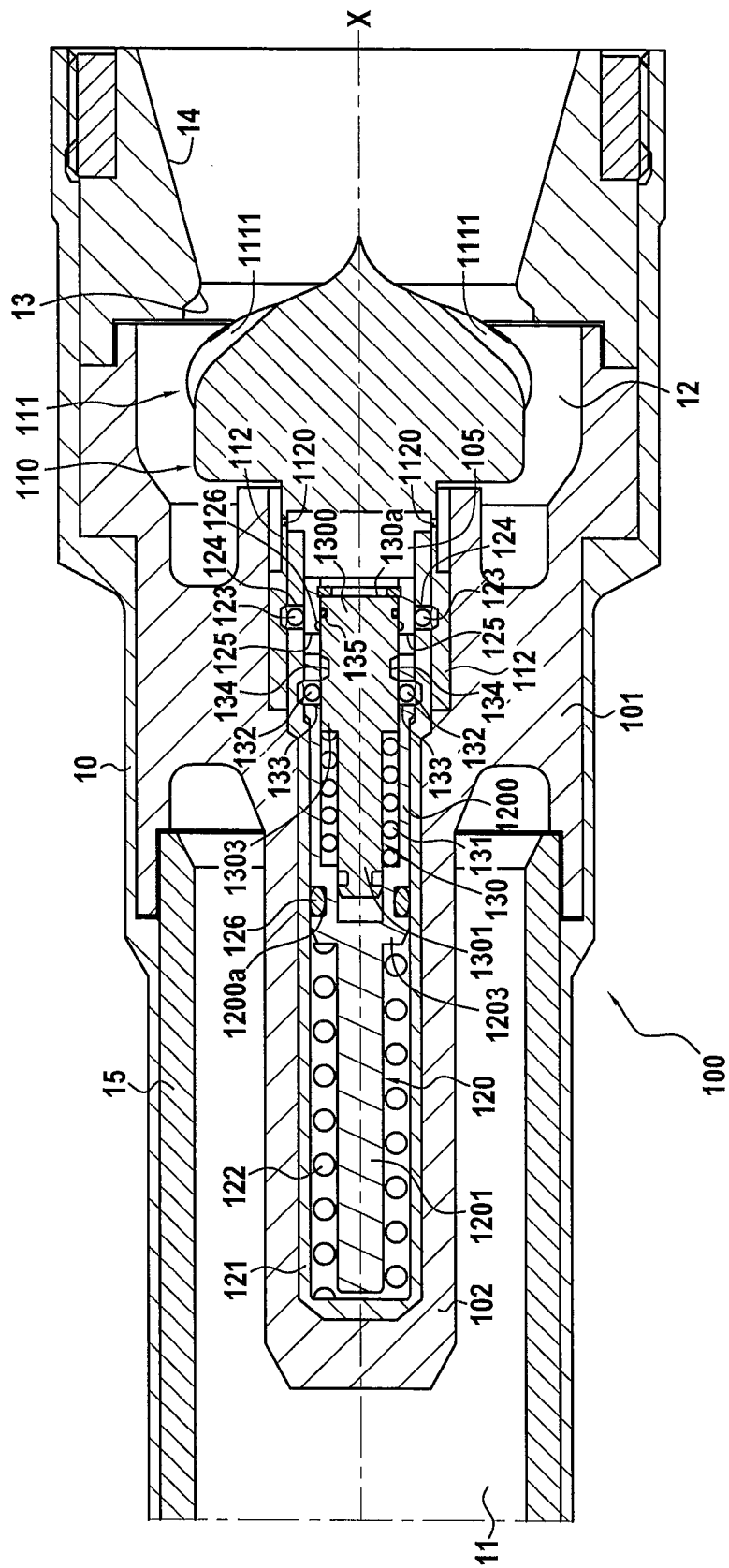
FIGS. 1A to 1D are diagrammatic longitudinal section views of a thruster rocket engine fitted with a device in accordance with an embodiment of the invention for modulating a gas ejection section.

FIG. 1A is a diagrammatic longitudinal section view of the rear portion of a rocket engine comprising a shell 10 in the form of a body of revolution surrounding a combustion chamber 11 housing a block of solid propellant (not shown) at its upstream end. The chamber 11 opens through the rear end wall of the shell upstream from a nozzle 12 having a nozzle throat 13 that forms the main ejection section followed by a diverging portion 14 that is shown in part only in FIG. 1A. An inner coating 15 may be formed on the inside wall of the shell 10 to provide thermal protection and sealing.

In accordance with the invention, a modulator device 100 for modulating a gas ejection section is arranged inside the shell 10 upstream from the nozzle throat 13. In the presently-described example, the modulator device 100 is held in position by two arms 101 fastened to the inside wall of the shell 10. The arms 101 are arranged at 180° from each other, with the remainder of the circumferential space present around the modulator device being left free to allow the gas from the combustion chamber 11 to flow towards the nozzle throat 13. The modulator device 100 comprises a casing 102 that extends axially inside the shell 10 and that is secured to the holder arms 101.

The modulator device 100 for modulating the gas ejection section comprises a shutter system 110 that is formed in this example by a needle 111 suitable for coming axially into abutment against the seat-forming nozzle throat 13, together with an axial control guide 112 for the needle 111. In the presently-described example, the axial control guide 112 is formed by a cylindrical element connected to the upstream end of the needle 111. Still in the presently-described example, the needle 111 is in the form of an axisymmetric part having a generally swollen or bulbous shape including axial grooves 1111 at its downstream end. Thus, when the needle 111 is in axial abutment against the nozzle throat 13, the gas from the combustion chamber upstream from the nozzle throat passes via the axial grooves 1111 and is then ejected by the diverging portion 14, the grooves 1111 forming the secondary ejection section (FIG. 1D). When the needle 111 is in its retracted position (FIG. 1A), the combustion gas passes via the main ejection section, i.e. flows normally through the nozzle throat 13 and is ejected directly by the diverging portion 14.

The modulator device 100 has a main piston 120 housed in a jacket 121, the main piston 120 having a hollow bottom portion 1200 and a top portion 1201 in the form of a rod around which there is arranged a thrust spring 122 that is in contact firstly with the end wall of the jacket 121 and secondly with a shoulder 1203 formed at the junction between the bottom portion 1200 and the top portion 1201. Sealing between the bottom portion 1200 of the main piston and the jacket 1201 is provided by a gasket 126 received in a housing 1200a formed in the bottom portion 1200 of the main piston 120.

The modulator device 100 also has a primer piston 130 received in the hollow bottom portion 1200 of the main piston 120 that forms a jacket for the primer piston 130. The primer piston has a bottom portion 1300 and a top portion 1301 in the form of a rod around which a return spring 131 is arranged in contact firstly with the hollow bottom portion 1200 and secondly with a shoulder 1303 formed at the junction between the bottom portion 1300 and the top portion 1301.

First balls 123 are placed around the main piston in housings 124 that extend through the jacket 121 and in a portion of the axial control guide 112 of the needle 111. The main piston 120 has cavities 125 for receiving the balls 123 during movement of the main piston, as described in detail below.

Second balls 132 are placed around the primer piston 130 in housings 133 that extend in the bottom portion 1200 of the main piston 120 and in a portion of the jacket 121. The primer piston has cavities 134 for receiving the balls 132 in part during movement of the main piston, as described in detail below.

The primer piston 130 is also provided with a prestressed ring 135 that is to be received in a groove 126 formed in the bottom portion 1200.

There follows an explanation of the operation of the modulator device 100 for modulating the gas ejection section during various stages of utilization of the rocket engine.

While the rocket engine is in storage, the modulator device is in the configuration shown in FIG. 1A, in which configuration the main piston is held stationary by the presence of the second balls 132 in the housings 133, the balls 132 in this configuration securing the main piston 120 to the jacket 121.

Figure 1B:
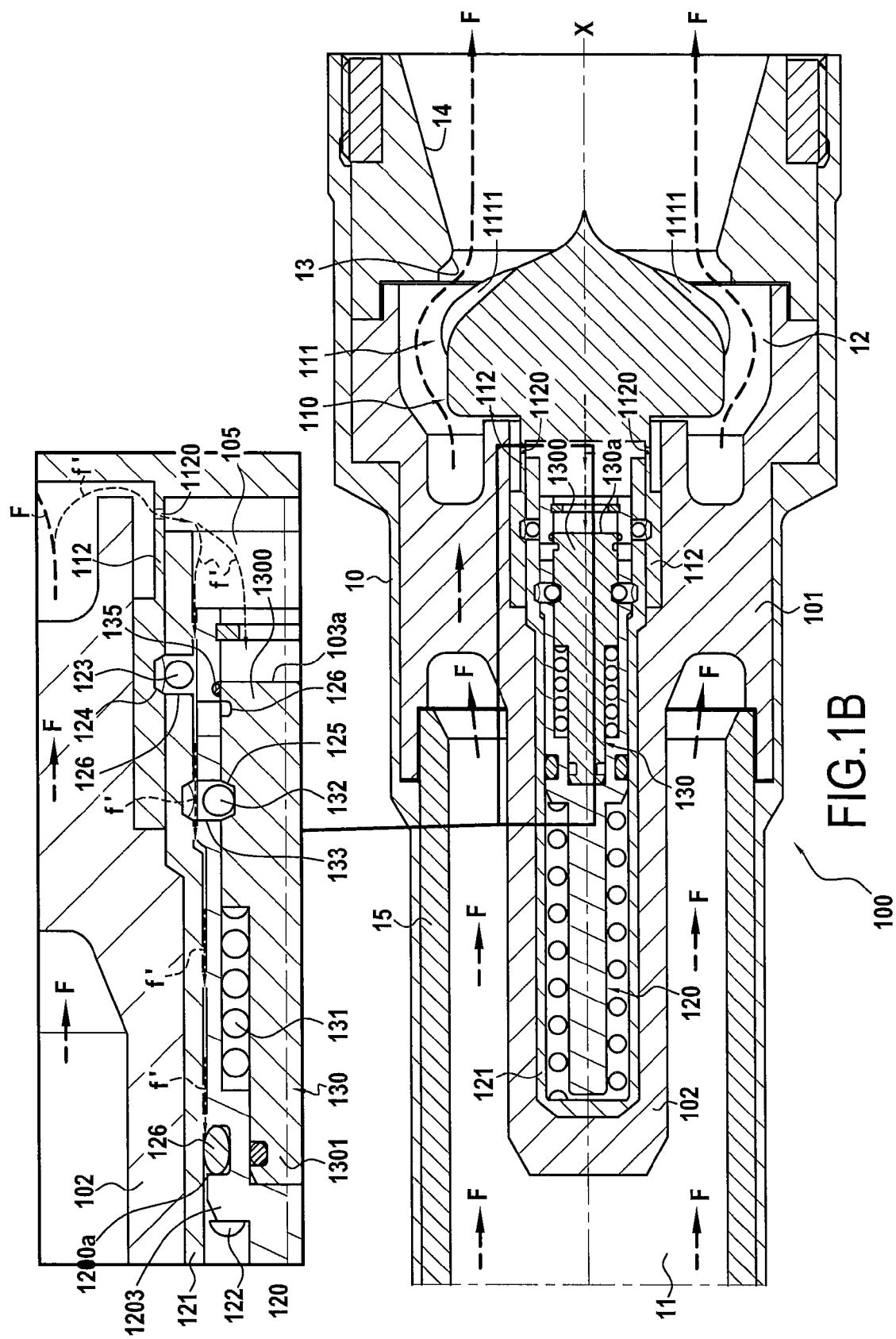

During a first stage of flight as shown in FIG. 1B, referred to as a high discharge phase or as a stage of priming the modulator device for modulating the gas ejection section, the stream F of ejection gas from the combustion chamber 11 flows around the modulator device 100 and passes via the main ejection section formed by the nozzle 12, by passing around the needle 111. A fraction f' of the flow of the stream F is taken off and brought into the inside space 105 of the modulator device via orifices 1120 formed through the axial control guide 112, The flow fraction f' entering the inside space 105 pressurizes the rear face 130a of the primer piston 130. When the pressure in the inside space 105, i.e. the pressure force exerted on the rear face of the primer piston 130, becomes greater than the force exerted in the opposite direction by the return spring 131 on the primer piston 130 together with friction, the primer piston moves axially towards the front of the modulator device such that the balls 132 penetrate in part into the cavities 134, thereby releasing the main piston 120 to move relative to the jacket 121. The stiffness of the return spring 131 is determined so that it compresses when the pressure in the modulator device reaches a first predetermined value corresponding to the flow rate value of the stream F beyond which it is desired to prime the modulator device 100.

The primer piston 130 is held in the front position by the ring 135 that becomes inserted into the groove 126 during the forward movement of the primer piston. The main piston 120 remains pressed in the forward direction by the pressure force exerted by the fraction f' of the flow of the stream F acting against the gasket 126 of the main piston. The thrust spring 122 associated with the main piston is held in compression thereagainst, said thrust spring exerting a thrust force on the main spring that is less than the pressure force exerted on the gasket 126 of the main piston while the pressure in the modulator device is greater than a second predetermined value, itself less than the first predetermined pressure value.

The modulator device 100 remains in this configuration so long as the pressure inside the modulator device is greater than the second predetermined value corresponding to the value of the flow rate of the stream F beyond which it is desired to modulate the gas ejection section.

Figure 1C:
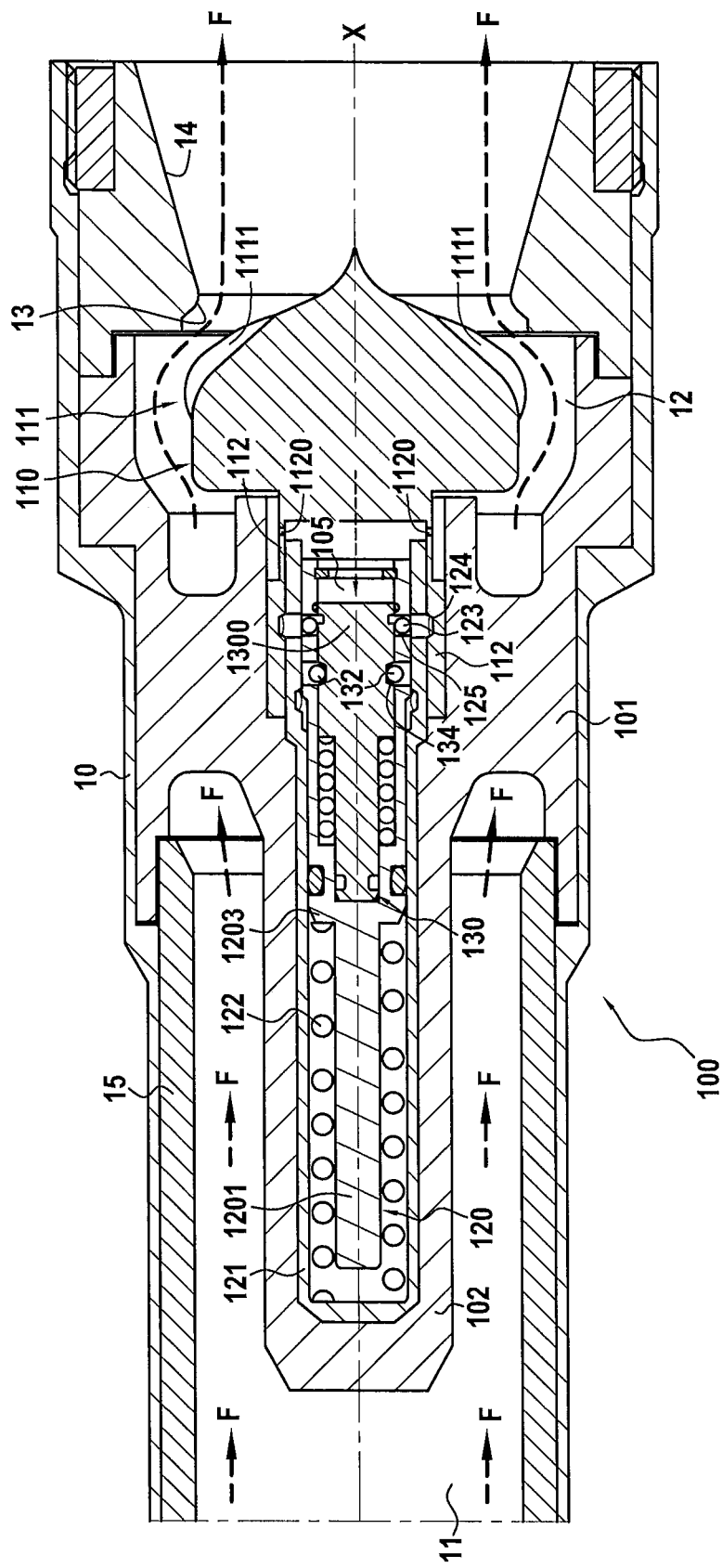
Figure 1D:
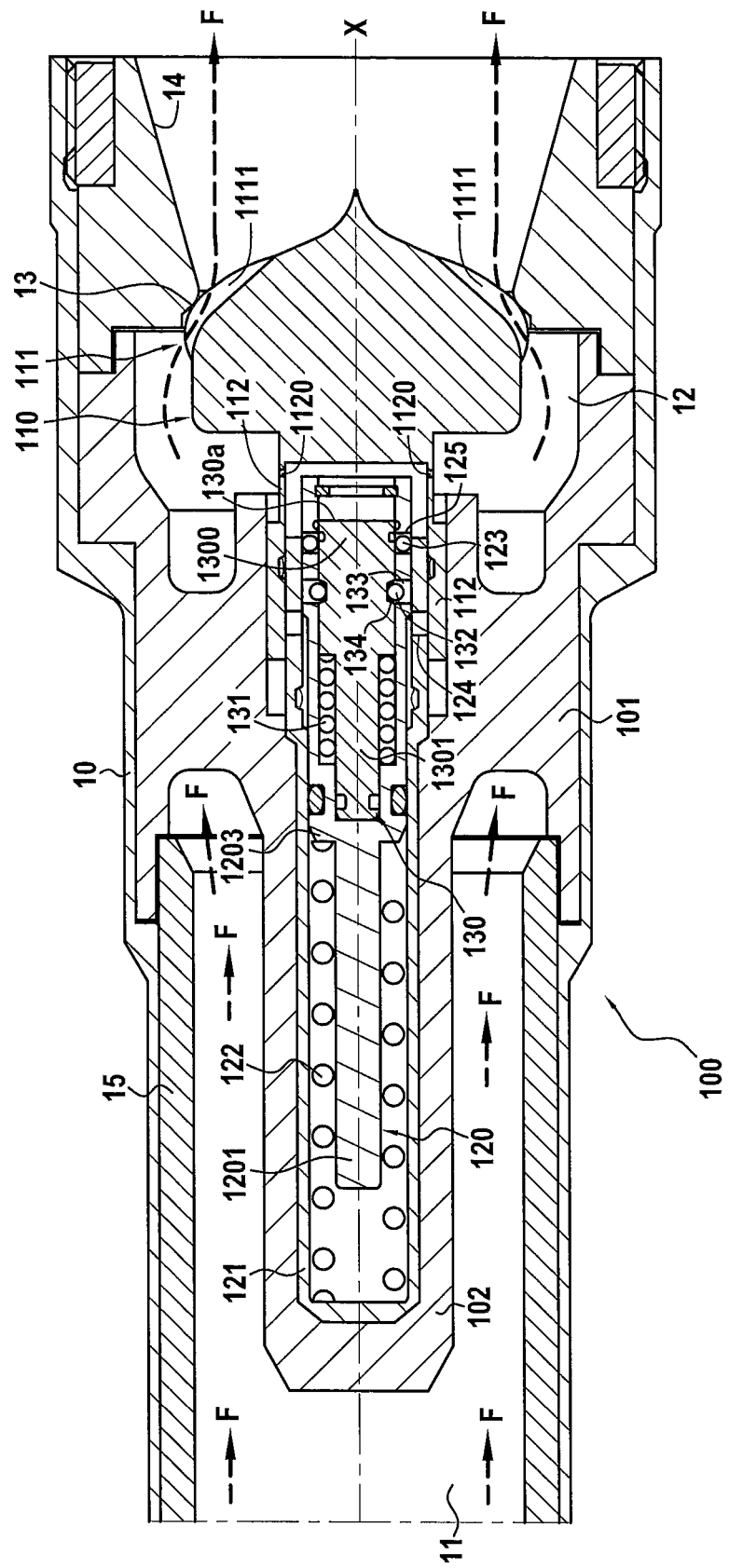

When the pressure in the modulator device drops at the end of the high discharge stage of operation, such that the rocket engine then enters into a low discharge stage of operation, and the pressure inside the modulator device reaches the second predetermined value, i.e. the value beyond which the thrust force from the spring 122 becomes greater than the pressure force exerted on the gasket 126 of the main piston, the main piston 120 moves in translation towards the rear of the modulator device, thereby enabling the balls 123 to penetrate fully into the cavities 125, thus releasing movement of the axial control guide 112 of the needle 111 relative to the jacket 121, as shown in FIG. 1C.

Once the axial control guide has been released in this way, the main piston takes up a position bearing against the front portion of the needle 111 and pushes it rearwards. The shutter system 110 then moves in translation towards the rear under the combined effect of aerodynamic forces exerted by the flow of the stream F on the needle 111 and by the thrust of the main piston 120 so as to position the needle in abutment against the nozzle throat 13, as shown in FIG. 1D. In this configuration, the needle obstructs in part the passage defined by the nozzle throat, the low discharge rate stream F passing solely via the secondary ejection section formed by the axial grooves 1111.

In a variant implementation, the thrust spring of the main piston may be replaced by a pyrotechnic device that is suitable for generating thrust on the main piston. Under such circumstances, a pyrotechnic delay is used that is initiated by the combustion gas and that is calibrated to trigger movement of the main piston at the moment of passing into the low discharge stage.

Figure 2A:
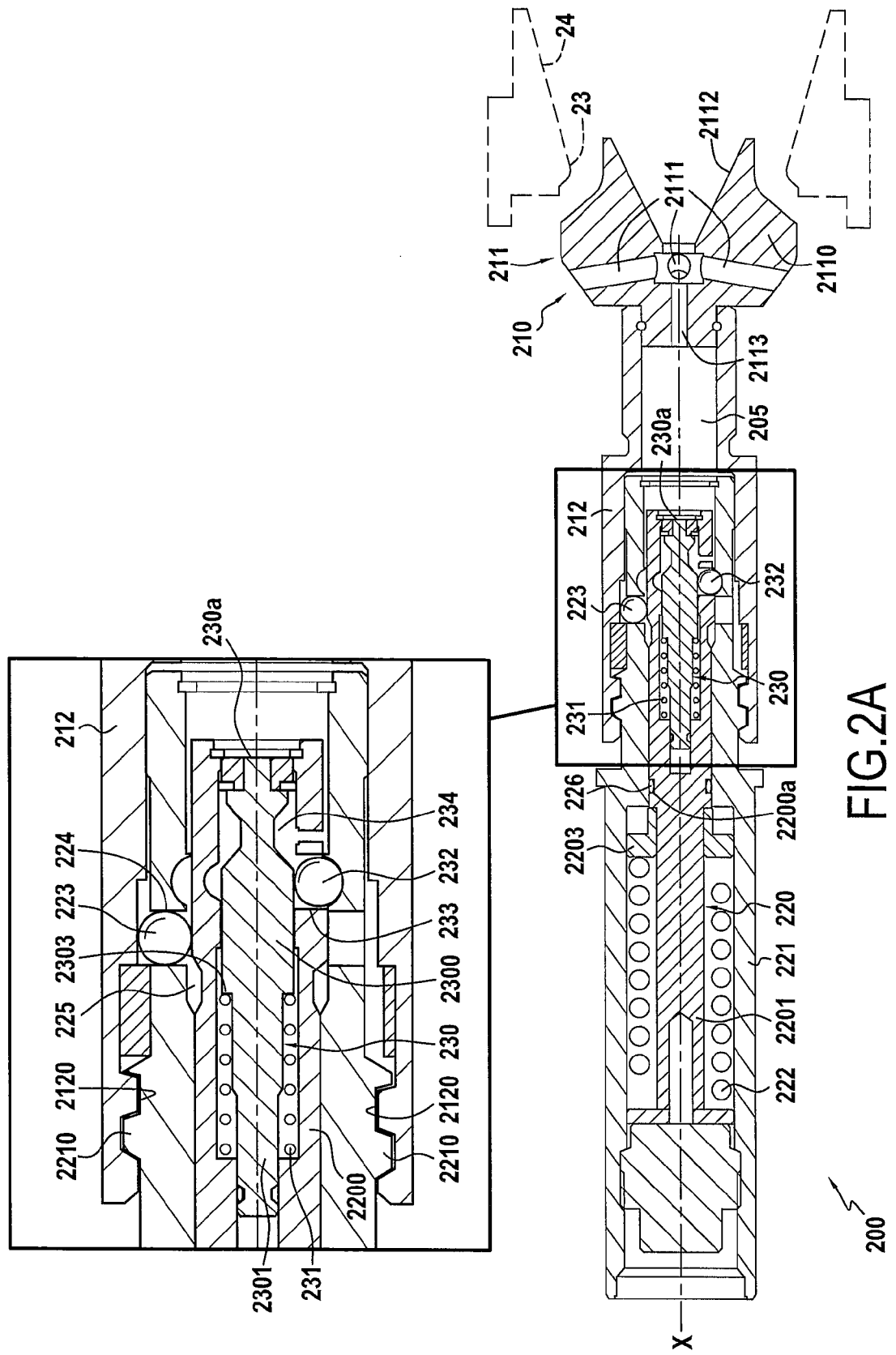
FIGS. 2A to 2D are diagrammatic longitudinal section views of a device in accordance with another embodiment of the invention for modulating a gas ejection section.

FIG. 2A is a diagrammatic longitudinal section view of a modulator device 200 for modulating a gas ejection section in another embodiment of the invention that is for arranging in the rear portion or nozzle of a rocket engine (not shown in FIG. 2A), as described above. The modulator device 200 for modulating the gas ejection section comprises a shutter system 210 that is formed in this example by a partial shutter member 211 for coming into axial abutment against a seat-forming nozzle throat 23 and leading to a diverging portion 24, and an axial control guide 212 for the partial shutter member 211 formed by a cylindrical element connected to the upstream end of the partial shutter member 211. The partial shutter member 211 is formed by an axisymmetric part 2110 having a generally swollen or bulbous shape including internal channels 2111 that open out firstly in the outer wall of the part 2110, and secondly in a secondary diverging portion 2112 formed in the downstream portion of the part 2110. Thus, when the partial shutter member 211 is in axial abutment against the nozzle throat 23, the gas from the combustion chamber upstream from the nozzle throat passes via the internal channels 2111 and is then ejected by the secondary diverging portion 2112 (FIG. 2C). When the partial shutter member is in its retracted position (FIG. 2A), the combustion gas passes via the main ejection section formed by the nozzle throat 23 and via the diverging portion 24. The part 2110 also has an internal channel 2113 connecting the internal channels 2111 to an internal space 205 inside the modulator device 200.

The modulator device 200 has a main piston 220 housed in a jacket 221, the main piston 220 having a hollow bottom portion 2200 and a top portion 2201 in the form of a rod having a return spring 222 arranged around it, which spring is in contact firstly with the end of the jacket 221 and secondly with a shoulder 2203. Sealing between the main piston 220 and the jacket 221 is provided by a gasket 226 placed in a housing 2200a formed in the bottom portion 2200 of the main piston 220.

The modulator device 200 also has a primer piston 230 housed in the hollow bottom portion 2200 of the main piston 220, which constitutes a jacket for the primer piston 230. The primer piston has a bottom portion 2300 and a top portion 2301 in the form of a rod having a return spring 231 arranged thereabout, which spring is in contact firstly with the hollow bottom portion 2200 and secondly with a shoulder 2303 arranged at the junction between the bottom portion 2300 and the top portion 2301.

First balls 223 are placed around the main piston in housings 224 that extend through the jacket 221 and in a portion of the axial control guide 212 of the partial shutter member 211. The main piston 220 has cavities 225 for receiving the balls 223 in part during the movement of the main piston, as described below in detail.

Second balls 232 are placed around the primer piston 230 in housings 233 that extend in the bottom portion 2200 of the main piston 220 and in a portion of the jacket 221. The primer piston has cavities 234 for receiving the balls 232 in part during the movement of the main piston, as described in detail below.

The modulator device 200 differs from the above-described modulator device in that the axial control guide 212 is screw-fastened on the jacket 221. More precisely, the jacket 221 has a two-start thread 2210 while the axial control guide 212 has corresponding two-start tapping 2120. Unscrewing of the axial control guide is prevented by the balls 223 so long as the modulator device 200 is in the configurations shown in FIGS. 2A and 2B. In contrast, when the modulator device 200 is in the configuration shown in FIG. 2C, i.e. when the balls 223 have penetrated into the cavities 225, the axial control guide is free to unscrew relative to the jacket 221, and it moves rearwards in translation. Using an attachment system with a two-start thread enables large forces to be taken up (typically of several kilonewtons (kN)) during the rearward movement in translation of the shutter system 210.

There follows an explanation of the operation of the modulator device 200 for modulating the gas ejection section during the various stages of utilization of a rocket engine.

While the rocket engine is in storage, the modulator device is in the configuration shown in FIG. 2A, in which configuration the main piston is held stationary by the presence of the second balls 232 in the housings 233, the balls 232 in this configuration securing the main piston 220 to the jacket 221.

Figure 2B:
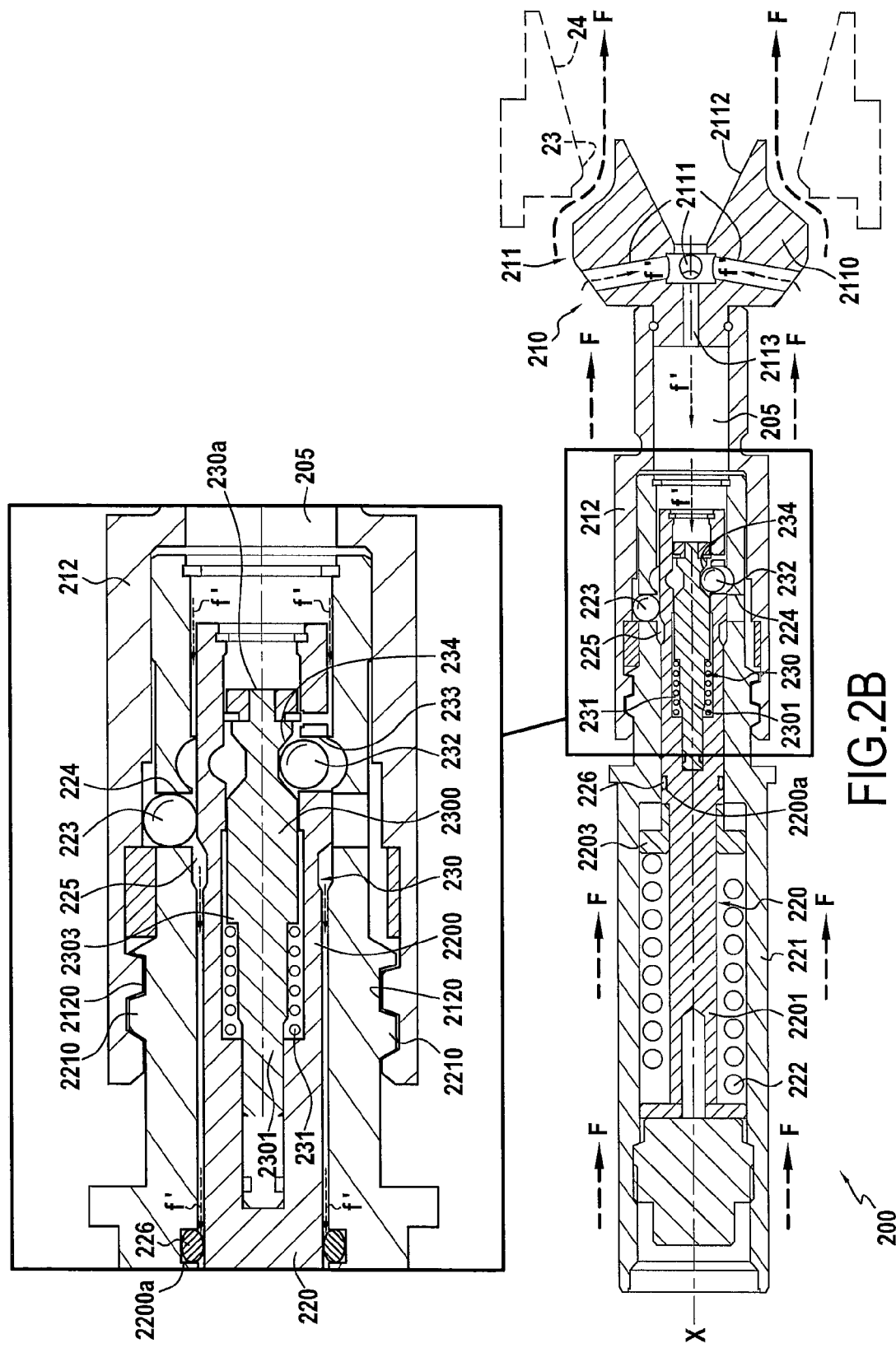
Figure 2C:
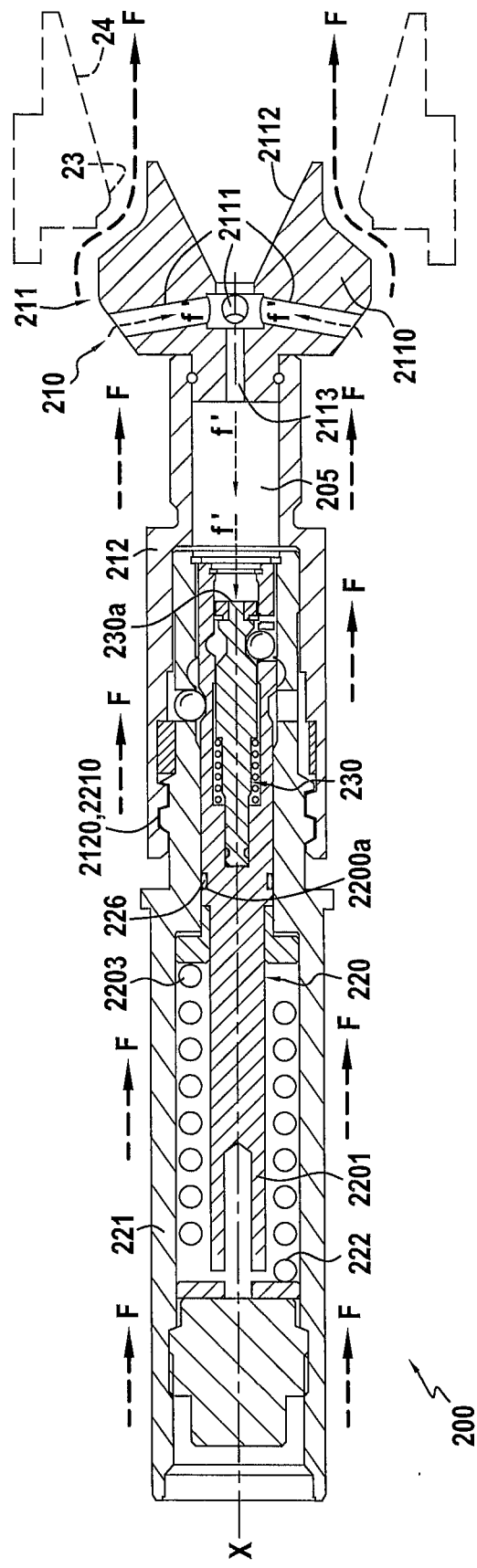

During a first stage of flight shown in FIG. 2B, referred to as a high discharge stage or as a stage of priming the modulator device for modulating the gas ejection section, the stream F of ejection gas coming from the combustion chamber (not shown in FIG. 2B) flows around the modulator device 200 and passes via the main ejection section by passing around the partial shutter member 211. A fraction f' of the flow of the stream F is taken off by the internal channels 2111 in the axisymmetric part 2110 of the partial shutter member and is brought into the internal space 205 of the modulator device via the internal channels 2113. The flow fraction f' entering into the internal space 205 pressurizes the rear face 230a of the primer piston 230. When the pressure in the space 205, i.e. when the pressure force exerted on the rear face of the primer piston 230, becomes greater than the force exerted in the opposite direction by the return spring 231 on the primer piston 230 together with friction, the primer piston moves axially towards the front of the modulator device such that the balls 232 penetrate in part into the cavities 234, thereby releasing the main piston 220 to move relative to the jacket 221. The stiffness of the return spring 231 is determined in such a manner that it becomes compressed when the pressure in the modulator device reaches a first predetermined value corresponding to the flow rate for the stream F beyond which it is desired to prime the modulator device 200.

The main piston 220 remains pressed forwards by the pressure force exerted by the fraction f' of the flow of the stream F against the gasket 226 of the main piston. The thrust spring 222 associated with the main piston is held in compression thereagainst, said thrust spring inserting a thrust force on the main spring that is less than the pressure force exerted on the gasket 226 of the main piston when the pressure inside the modulator device is greater than a second predetermined value, itself less than the first predetermined pressure value.

The modulator device 200 remains in this configuration so long as the pressure in the modulator device is higher than the second predetermined value corresponding to the value of the flow rate of the stream F beyond which it is desired to modulate the gas ejection section.

When the pressure in the modulator device drops at the end of the high discharge stage of operation, such that the rocket engine enters into the low discharge stage and the pressure in the modulator device reaches the second predetermined value, i.e. the value from which the thrust force from the spring 222 becomes greater than the pressure force exerted on the gasket 226 of the main piston, the main piston 220 moves in translation towards the rear of the modulator device, enabling the balls 223 to penetrate into the cavities 225, thus releasing the axial control guide 212 of the partial shutter member 211 to move relative to the jacket 221, as shown in FIG. 2C.

Figure 2D:
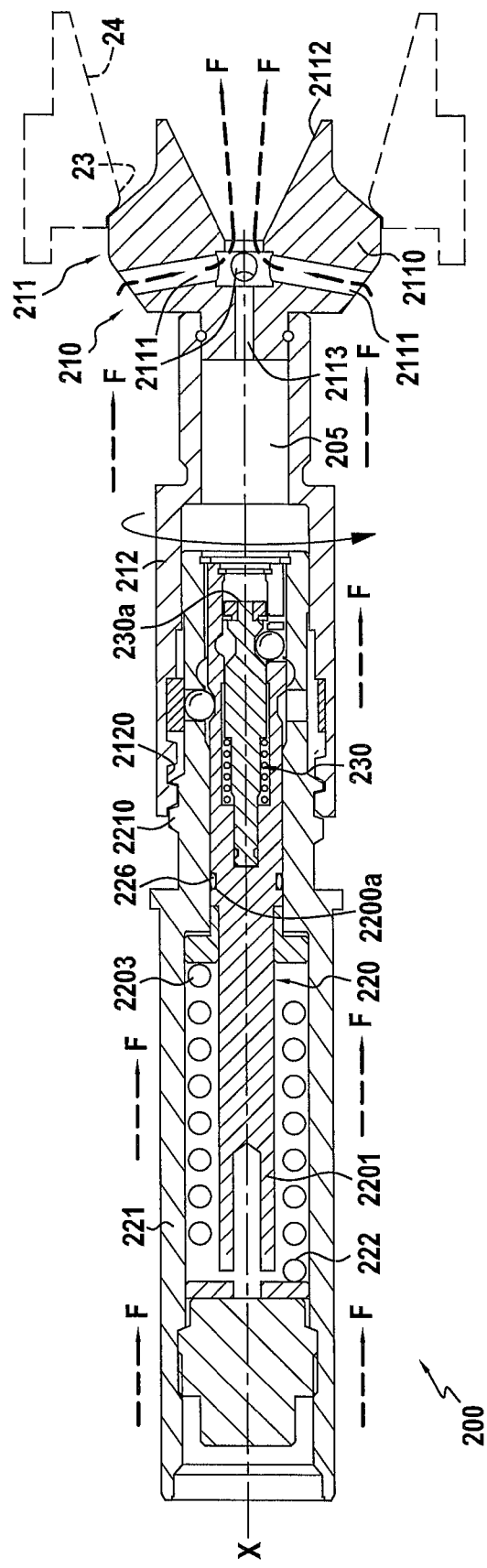

Once the axial control guide has been released in this way, it unscrews and then moves in translation towards the rear under the effect of the aerodynamic forces exerted by the flow of the stream F on the partial shutter member 221 so as to position the partial shutter member in abutment against the nozzle throat 23, as shown in FIG. 2D. In this configuration, the partial shutter embodiment obstructs the passage defined by the nozzle throat, the low discharge stream F passing solely via the secondary ejection section formed by the internal channels 2111 and the secondary diverging portion 2112.

The modulator device of the invention for modulating the gas ejection section may be used in rocket engines or launchers having solid propulsion (solid propellant), liquid propulsion (liquid propellant), or hybrid propulsion (solid and liquid propellants).

The invention claimed is:

1. A modulator device for modulating a gas ejection section, the modulator device located upstream from a throat of a rocket nozzle, the modulator device comprising a partial shutter member for partially shutting the throat, a control guide for the partial shutter member, a main piston, and a primer piston, the control guide being movable between a retraction position in which the partial shutter member is held at a distance from the throat and a shutting position in which the partial shutter member is in contact with the throat; the primer piston being movable between a rest position in which the primer piston locks the main piston against moving, and a priming position in which the primer piston unlocks movement of the main piston, said primer piston moving from the rest position to the priming position when a pressure in the modulator device reaches a first predetermined value; and the main piston being movable between a first position in which movement of the control guide is locked in the retraction position, and a second position in which movement of the control guide is unlocked, the main piston moving from the first position to the second position when the primer piston is in the priming position and when the pressure in the modulator device reaches a second predetermined value less than the first predetermined value.

2. The modulator device according to claim 1, further comprising a return spring for holding the primer piston in the rest position, wherein a stiffness of the return spring is such that said return spring compresses when the pressure in the modulator device reaches the first predetermined value.

3. The modulator device according to claim 1, further comprising a thrust spring held in compression against the main piston, said thrust spring exerting on the main piston a thrust force that is greater than the pressure exerted on said main piston when the pressure in the modulator device reaches the second predetermined value.

4. The modulator device according to claim 1, further comprising one or more balls placed around an outer wall of the primer piston, said one or more balls being held in a housing extending both in the main piston and in a stationary jacket surrounding said main piston while the primer piston is in the rest position, and wherein the primer piston includes one or more cavities suitable for receiving the one or more balls in part when said primer piston is in the priming position so as to unlock the movement of the main piston.

5. The modulator device according claim 1, further comprising one or more balls placed around an outer wall of the main piston, said one or more balls being held in a housing extending both in a stationary jacket surrounding the main piston and in the control guide of the partial shutter member when the main piston is in the first position, and wherein the main piston includes one or more cavities suitable for partially receiving the one or more balls when said main piston is in the second position so as to unlock movement of the control guide of the partial shutter member.

6. The modulator device according to claim 1, wherein the main piston is suitable for pushing the control guide towards the shutting position when the primer piston is in the priming position and when the pressure in the modulator device reaches the second predetermined value.

7. The modulator device according to claim 1, wherein the control guide is mounted on a jacket of the main piston by a sliding connection.

8. The modulator device according to claim 1, wherein the control guide is mounted on a jacket of the main piston via a two-start screw connection.

9. A rocket nozzle of variable throat section comprising a throat, a diverging portion, and a modulator device for modulating a gas ejection section, said modulator device being placed in the nozzle upstream from said throat, the modulator device comprising a partial shutter member for partially shutting the throat, a control guide for the partial shutter member, a main piston, and a primer piston, the control guide being movable between a retraction position in which the partial shutter member is held at a distance from the throat and a shutting position in which the partial shutter member is in contact with the throat; the primer piston being movable between a rest position in which the primer piston locks the main piston against moving, and a priming position in which the primer piston unlocks movement of the main piston, said primer piston moving from the rest position to the priming position when a pressure in the modulator device reaches a first predetermined value; and the main piston being movable between a first position in which movement of the control guide is locked in the retraction position, and a second position in which movement of the control guide is unlocked, the main piston moving from the first position to the second position when the primer piston is in the priming position and when the pressure in the modulator device reaches a second predetermined value less than the first predetermined value.

10. A rocket engine including a rocket nozzle of variable throat section according to claim 9.

11. The rocket nozzle of variable throat section according to claim 9, wherein the modulator device further comprises a return spring for holding the primer piston in the rest position, wherein a stiffness of the return spring is such that said return spring compresses when the pressure in the modulator device reaches the first predetermined value.

12. The rocket nozzle of variable throat section according to claim 9, wherein the modulator device further comprises a thrust spring held in compression against the main piston, said thrust spring exerting on the main piston a thrust force that is greater than pressure exerted on said main piston when the pressure in the modulator device reaches the second predetermined value.

13. The rocket nozzle of variable throat section according to claim 9, wherein the modulator device further comprises one or more balls placed around an outer wall of the primer piston, said one or more balls being held in a housing extending both in the main piston and in a stationary jacket surrounding said main piston while the primer piston is in the rest position, and wherein the primer piston includes one or more cavities suitable for receiving the one or more balls in part when said primer piston is in the priming position so as to unlock the movement of the main piston.

14. The rocket nozzle of variable throat section according to claim 9, wherein the modulator device further comprises one or more balls placed around an outer wall of the main piston, said one or more balls being held in a housing extending both in a stationary jacket surrounding the main piston and in the control guide of the partial shutter member when the main piston is in the first position, and wherein the main piston includes one or more cavities suitable for partially receiving the one or more balls when said main piston is in the second position so as to unlock movement of the control guide of the partial shutter member.

15. The rocket nozzle of variable throat section according to claim 9, wherein the main piston is suitable for pushing the control guide towards the shutting position when the primer piston is in the priming position and when the pressure in the modulator device reaches the second predetermined value.

16. The rocket nozzle of variable throat section according to claim 9, wherein the control guide is mounted on a jacket of the main piston by a sliding connection.

17. The rocket nozzle of variable throat section according to claim 9, wherein the control guide is mounted on a jacket of the main piston via a two-start screw connection.

18. The rocket engine according to claim 10, wherein the rocket engine is a solid propellant rocket engine.

* * * * *